US011949198B2

(12) United States Patent
Fries et al.

(10) Patent No.: US 11,949,198 B2
(45) Date of Patent: Apr. 2, 2024

(54) ELECTRIFIED STRIP ARRANGEMENT

(71) Applicant: Elkamet Kunststofftechnik GmbH, Biedenkopf (DE)

(72) Inventors: Thorsten Fries, Siegen (DE); Juergen Ruehl, Reichelsheim (DE); Andreas Schoch, Marburg (DE); Igor Dorscht, Gladenbach-Mornshausen (DE); Michael Klein, Hatzfeld-Reddighausen (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 93 days.

(21) Appl. No.: 17/768,501

(22) PCT Filed: Oct. 5, 2020

(86) PCT No.: PCT/DE2020/100859

§ 371 (c)(1),
(2) Date: Apr. 13, 2022

(87) PCT Pub. No.: WO2021/073685

PCT Pub. Date: Apr. 22, 2021

(65) Prior Publication Data

US 2023/0198214 A1 Jun. 22, 2023

(30) Foreign Application Priority Data

Oct. 18, 2019 (DE) ..................... 10 2019 007 253.7

(51) Int. Cl.
*H01R 43/24* (2006.01)
*E06B 3/54* (2006.01)

(52) U.S. Cl.
CPC .......... *H01R 43/24* (2013.01); *E06B 3/5454* (2013.01); *H01R 2201/26* (2013.01)

(58) Field of Classification Search
CPC ... H01R 43/24; H01R 2201/26; E06B 3/5454; E06B 3/20; E06B 3/6722
See application file for complete search history.

(56) References Cited

U.S. PATENT DOCUMENTS 4,621,478 A * 11/1986 Phillips ................. E06B 3/5821 52/235
6,666,702 B1 * 12/2003 Pickles ................ H01R 12/716 439/328

(Continued)

FOREIGN PATENT DOCUMENTS

DE 10360255 A1 7/2005
DE 202015008064 U1 1/2016

(Continued)

*Primary Examiner* — Truc T Nguyen
(74) *Attorney, Agent, or Firm* — LEYDIG, VOIT & MAYER, LTD.

(57) ABSTRACT

A molding assembly for establishing an electrical connection between an electrified planar element, which is formed with a peripheral electrical contact, and an electrical device includes a plastic frame element having an electrical conductor. The plastic frame element is adapted to be disposed along a peripheral portion of the electrified planar element that includes the peripheral contact. The plastic frame element extends between two ends. The electrical conductor extends between the two ends of the plastic frame element on a side facing the electrified planar element so that, during attachment of the plastic frame element to the peripheral portion, an electrical connection is automatically establishable between the electrical conductor and the peripheral contact.

15 Claims, 7 Drawing Sheets

(56) References Cited

U.S. PATENT DOCUMENTS

| | | | | |
|---|---|---|---|---|
| 6,764,345 | B1 * | 7/2004 | Duesterhoeft | H01R 12/721 439/637 |
| 10,525,808 | B2 * | 1/2020 | Schoch | B60J 10/32 |
| 11,139,598 | B1 * | 10/2021 | Casher | H01R 12/737 |
| 2011/0151701 | A1 * | 6/2011 | Ngo | H01R 12/732 439/327 |
| 2014/0194006 | A1 * | 7/2014 | Hsu | H01R 12/716 439/620.2 |
| 2016/0064845 | A1 * | 3/2016 | Endo | H01R 13/11 439/884 |
| 2020/0313358 | A1 * | 10/2020 | Casher | H01R 12/721 |
| 2020/0328542 | A1 * | 10/2020 | Qin | H01R 12/57 |
| 2023/0246361 | A1 * | 8/2023 | Fan | H01R 13/631 439/629 |

FOREIGN PATENT DOCUMENTS

| | | | |
|---|---|---|---|
| EP | 3219529 | A1 | 9/2017 |
| WO | WO 2012/148103 | A1 | 11/2012 |

* cited by examiner

ELECTRIFIED STRIP ARRANGEMENT

CROSS REFERENCE TO RELATED APPLICATIONS

This application is a U.S. National Phase application under 35 U.S.C. § 371 of International Application No. PCT/DE2020/100859, filed on Oct. 5, 2020, and claims benefit to German Patent Application No. DE 10 2019 007 253.7, filed on Oct. 18, 2019. The International Application was published in German on Apr. 22, 2021 as WO 2021/073685 A1 under PCT Article 21(2).

FIELD

The present invention relates to a molding assembly for establishing an electrical connection between an electrified planar element, which is formed with a peripheral electrical contact, and an electrical device.

BACKGROUND

Today, there is no standardized common solution for electrically contacting smart glass or functional planar elements or electrified planar elements. Smart glass, for example, can be understood to include glass panes whose appearance can change as a result of physical influences such as UV radiation, heat, or electric current, such as, for example, dimmable glass. For this purpose, a special film is laminated between two glass panes and electrically contacted via electrical contacts leading out of the glass. Contact to the power source is made by soldering or by a connector with cables. The cables must be routed away from the planar element and run such that they are protected. Moreover, they must be connected to a power supply/signal source, which is usually done in a freely wired manner. In general, the invention also relates to less complex applications, as illustrated in document DE 103 60 255 A1, where the same problem arises for a heated window pane in the automotive domain.

Generally, an expert is required to realize power supply to the planar element and electrical contacting thereof. A cable path must be provided in the adjacent components, or at least sufficient installation space, which influences the design of these components. Loose cables complicate the assembly of individual planar elements in the case of a (e.g., segmented) large surface area including a plurality of smaller planar elements. Depending on the particular installation, the cables and contacts are visible, which is of course visually less appealing and gives the impression of an unfinished solution. It is therefore desirable to eliminate these drawbacks and provide a more suitable solution.

SUMMARY

In an embodiment, the present invention provides a molding assembly for establishing an electrical connection between an electrified planar element, which is formed with a peripheral electrical contact, and an electrical device. The molding assembly includes a plastic frame element having an electrical conductor. The plastic frame element is adapted to be disposed along a peripheral portion of the electrified planar element that includes the peripheral contact. The plastic frame element extends between two ends. The electrical conductor extends between the two ends of the plastic frame element on a side facing the electrified planar element so that, during attachment of the plastic frame element to the peripheral portion, an electrical connection is automatically establishable between the electrical conductor and the peripheral contact.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
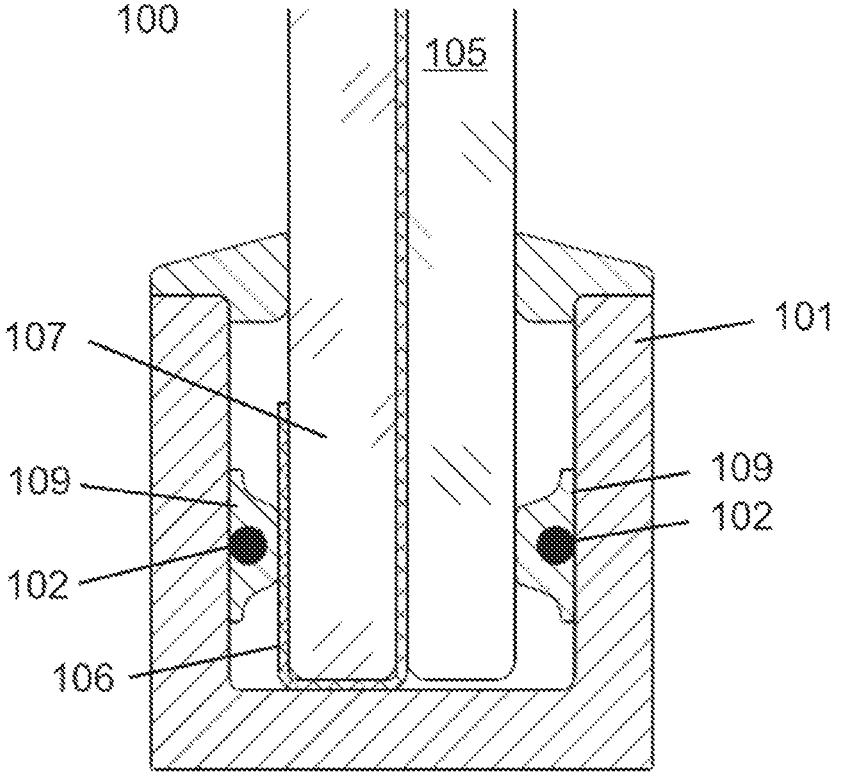
FIGS. 1*a* and 1*b* show a first embodiment of the molding assembly according to the invention.

In accordance with embodiments of the invention, there is provided a molding assembly and a planar element having such a molding assembly, as well as a wall according to an embodiment of the invention.

The planar element used may be, for example, an electrified window pane made, for example, of smart glass or electrochromic glass. An embodiment of the invention includes both single glazing and multiple glazing.

The invention, according to an embodiment, is based on the idea of reducing the assembly effort for electrified planar elements by using as high a proportion of identical parts as possible, which cost-effectively reduce and simplify the effort required for wiring and electrical contacting electrified planar elements.

The approach according to an embodiment of the invention eliminates the disadvantages mentioned and provides a high degree of flexibility, because due to the implementation according to an embodiment of the invention, the molding assembly can be used—independently of the location of the peripheral contact—on planar elements having peripheral contacts at a variety of different positions. A variety of planar elements from different manufacturers can be equipped with the same molding assembly. The inventive molding assembly can be readily produced as a strand by extrusion. It is also conceivable to produce a standard length that can be cut to size and processed by the customers themselves (e.g., miter-cut for the framing of planar elements). Alternatively, specially shaped connecting elements having electrical conductors may be used for connecting moldings.

Preferably, the conductor is implemented using a metal (e.g., stranded wire, solid wire, etc.). This variant has the advantage that the electrical losses in the conductor are minimal and that the conductor can be readily incorporated into the plastic frame element, for example during extrusion of the plastic frame element. This assembly is inexpensive and can be produced in large quantities with minimum cycle times.

Alternatively, the conductor may be implemented using solely an electrically conductive second plastic material which, due to the presence of electrically conductive plastic additives (e.g., carbon black, metal particles, and the like), has an electrical resistance many times lower than the electrical resistance of a first plastic material with which the plastic frame element may be implemented. This variant has the advantage that both the conductor and the frame element can be inexpensively produced in large quantities with just as low cycle times by co-extrusion of the first and second plastic materials.

Further alternatively, the conductor may also be implemented using a combination of the two aforementioned variants, namely from an electrically conductive second plastic material and a metal. In this case, a metallic conductor constitutes the conductor core, which may be overmolded or covered by the second plastic material at least along a portion or portions thereof and at least on the side facing the planar element. The production can be accomplished by co-extruding the first and second plastic materials and simultaneously incorporating the metallic conductor. This approach is just as advantageous as the two aforementioned approaches.

To establish the connection, preferably a plurality of first contact elements, in particular spring contact elements, are provided along the conductor, the conductor and/or the contact elements preferably being formed in one piece. The conductor and the contact elements can thus be readily and inexpensively produced, for example using a strip of sheet metal, which is processed according to an embodiment of the invention in such a manner as to form a continuous conductor with contact springs disposed along the conductor.

As an alternative to the above-mentioned variant, a freely positionable coupling element may be provided along the conductor so as to make the molding configurable. In order to also cover more complex fields of application, a plurality of coupling elements may be provided in conjunction with a plurality of mutually insulated conductors to implement a plurality of connections which are electrically insulated from one another. Examples which may be mentioned in this context include electrified planar segments within a single planar element, which planar segments can be controlled segment by segment, or a wall including a plurality of planar elements which are interconnected by segmented and/or continuous molding assemblies.

Preferably, it is provided that the coupling element include second contact elements for electrically contacting the conductor and/or the peripheral contact, thereby allowing the coupling element to be electrically contacted to the conductor and/or to the peripheral contact as the connection is being established. This has the advantage that all electrical components initially remain electrically insulated from one another until the molding assembly is attached to the planar element. These contact elements are preferably implemented as piercing contacts and/or as cutting contacts. Both variants are suitable for piercing the conductive and/or non-conductive plastic sheath of the conductor at selected points or locally cutting therethrough transversely to the extent of the conductor and such that such piercing or cutting does not occur until during attachment of the plastic frame element to the planar element, so that the conductor is electrically contacted only at the desired positions for establishing a connection.

It is understood that the aforementioned features may also be present in multiples thereof. For example, two or more mutually insulated conductors may be provided and extend along the plastic frame element.

Furthermore, especially in the case of two or more conductors, the peripheral contact may be insulated from one or more of the conductors in defined regions. In this way, only selected conductors may be selectively electrically contacted in a defined region.

An embodiment of the invention also includes connecting elements for connecting individual inventive plastic frame elements with electrical conductors. At the level of the electrical conductors, the connecting elements also have one or more electrical conductors. Depending on the particular shape of the connecting element, these serve to connect two inventive moldings in a longitudinal direction or to connect two moldings at an angle of 90° with respect to each other. However, other angles are also possible and within the scope of the invention. Optionally, a connecting element may also have located therein the electrical supply lead for supplying power to the molding assembly.

It is also understood that the features mentioned hereinbefore and the features in the drawings to be commented on hereinafter may be used not only in the specified combinations, but also in other combinations not explicitly specified here or alone or in isolation without departing from the scope of the present invention. This applies particularly to all features which are shown and/or described in the various embodiments merely for the sake of completeness, but are not essential to the invention; i.e., those which are not absolutely necessary to achieve the effects of the invention.

An embodiment of the invention is hereinafter illustrated in rough schematic form in the drawings with reference to the following exemplary embodiments and briefly described with reference to the drawings. Like or functionally equivalent features are given the same reference numerals unless otherwise specified.

The following FIGS. 1*a* through 4 show exemplary and preferred variants of the inventive molding assembly 100 in sectional view. The assemblies shown here each include a planar element 105 in the form of an electrified window pane (e.g., electrochromic glass), which is formed with an external flexible flat ribbon conductor or an electrically conductive foil as a peripheral contact 106. For purposes of controlling the electrochromic layer (e.g., data, signals) and/or powering the same (e.g., electric current and/or electric voltage), a respective electrical device is required. The connection between peripheral contact 106 of planar element 105 and the device can be advantageously implemented using the inventive molding assembly 100. FIGS. 1*a* through 4 each show in rough schematic form a plastic frame element 101 which is preferably U-shaped in cross section and has two electrical conductors 102 and a planar element 105 having a peripheral contact 106. Plastic frame element 101 extends along the edge of planar element 105 on both sides thereof. Besides the U-shaped cross section, other cross-sections are also conceivable, such as an L-shaped cross section. In any case, at least one contact surface must be provided for attachment of plastic frame element 101 to the edge of the planar element.

FIG. 1*a* shows, by way of example, a first molding assembly 100 where conductors 102 are provided opposite each other along plastic frame element 101 on the side facing the planar element, so that during attachment of plastic frame element 101 to the peripheral portion 107, conductors 102 come automatically and directly into contact with peripheral contacts 106, and an electrical connection is established between electrical conductors 102 and peripheral contacts 106. In FIG. 1*a*, only a left contact to first conductor 102 is indicated, while the right conductor 102 is intended for a second peripheral contact 106 provided at a different location. Both conductors 102 are surrounded by a conductive plastic material 109 which is directly adjacent to the plastic material of plastic frame element 101 or, for example, connected thereto, preferably by a material-to-material bond through co-extrusion. Plastic frame element 101 may be flexible so that planar element 105 together with its peripheral contacts 106 is clamped between the conductors 102 of the two legs of the frame element (e.g., in the case of a suitable U-shape). Alternatively, a reliable contact may also be achieved by adhesive attachment of plastic frame element 101 (e.g., in the case of an L-shape) so that peripheral contacts 106 are clamped between conductors 102 and planar element 105.

Figure 1B:
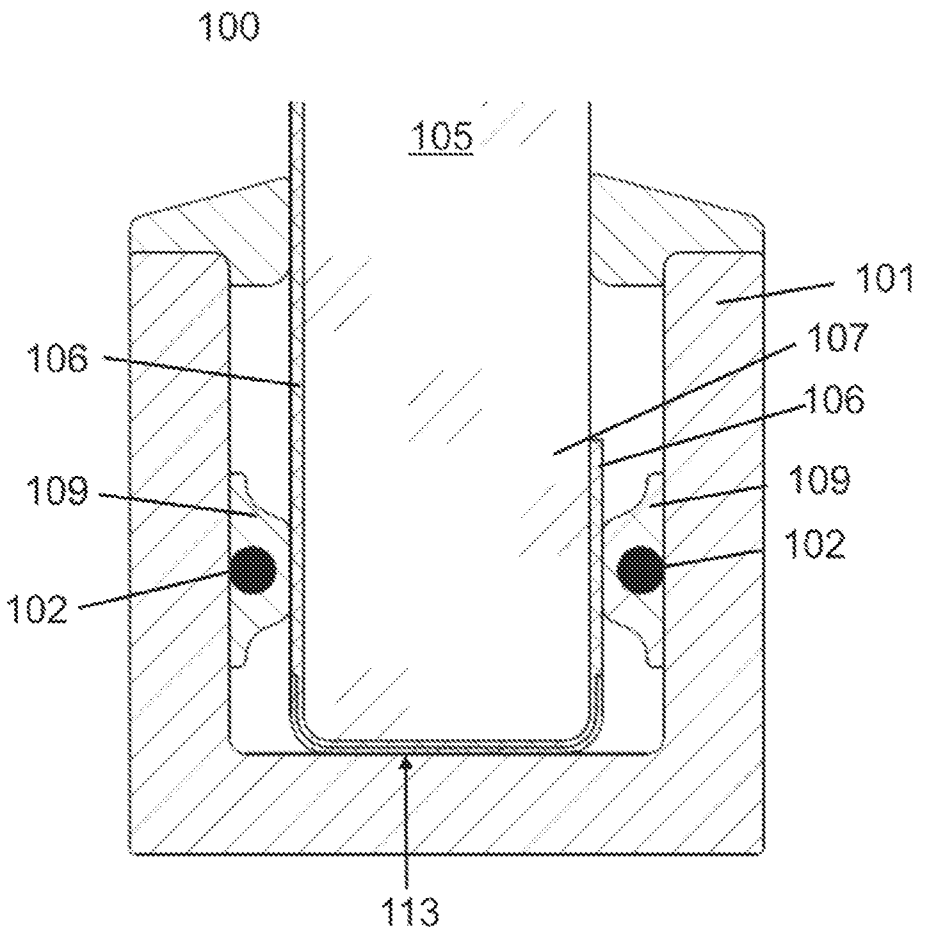

FIG. 1*b* shows a molding assembly 100 having a planar element 105 in the form of a simple glass pane and a peripheral contact 106 in the form of a conductive foil. Peripheral contact 106 includes an electrically insulating layer 113 between the points of contact with electrical conductors 102. Plastic frame element 101 is provided on both sides with electrical conductors 102, which are surrounded by an electrically conductive plastic material 109. In other respects, what has been said before with respect to FIG. 1*a* applies here as well.

Figure 2A:
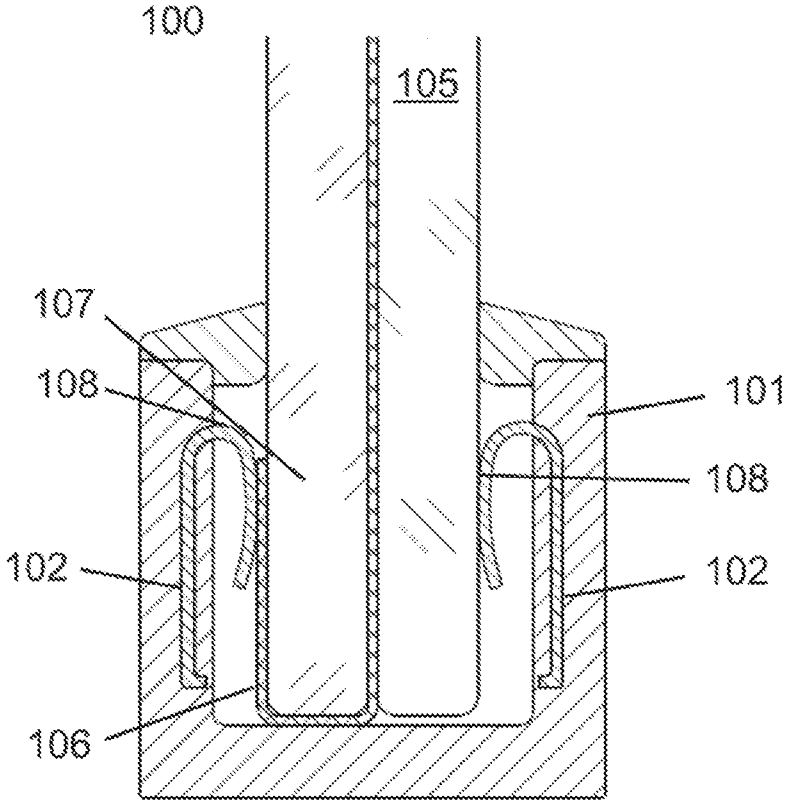
FIGS. 2*a* and 2*b* show a second embodiment of the molding assembly according to the invention.

FIG. 2*a* shows, by way of example, a second molding assembly 100 where a plurality of contact elements 108 are provided preferably continuously along two opposite conductors 102, the conductors 102 and the contact elements 108 respectively being preferably formed in one piece. The material used is preferably an elastic material for implementing spring contact elements which, during attachment of plastic frame element 101 to the peripheral portion 107, automatically make resilient contact with peripheral contacts 106, thus establishing an electrical connection between electrical conductors 102 and peripheral contacts 106. In FIG. 2*a*, only a left contact to first conductor 102 is indicated, while the right conductor 102 is intended for a second peripheral contact 106 provided at a different location. Both conductors 102 are preferably surrounded by the material of plastic frame element 101 at least along a portion or portions thereof, whereas contact elements 108 extend out from the legs of plastic frame element 101 and, as illustrated, are formed such that they resiliently bear against peripheral contact 106.

Figure 2B:
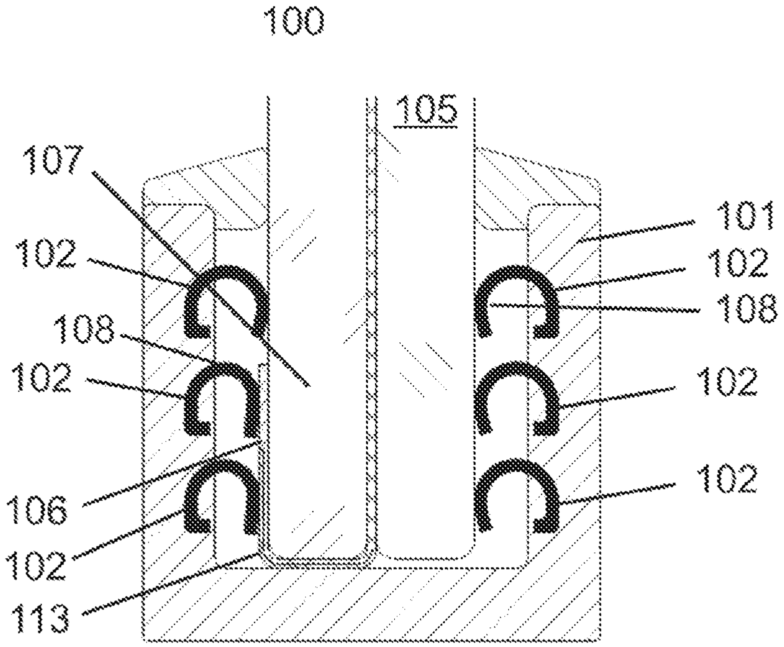

FIG. 2*b* shows a plurality of conductors 102 disposed one above another, with conductors 102 at the same level being arranged opposite one another in pairs. For purposes of selective electrical contacting, the portion of peripheral contact 106 that must not come into contact with conductor 102 is provided with an electrically insulating layer 113. In FIG. 2*b*, only a left contact to first conductor 102 is indicated, while the right conductor 102 is intended for a second peripheral contact 106 provided at a different location. Conductors 102 are preferably surrounded by the material of plastic frame element 101 at least along a portion or portions thereof, whereas contact elements 108 extend out from the legs of plastic frame element 101 and are formed such that they resiliently bear against peripheral contact 106.

Figure 3:
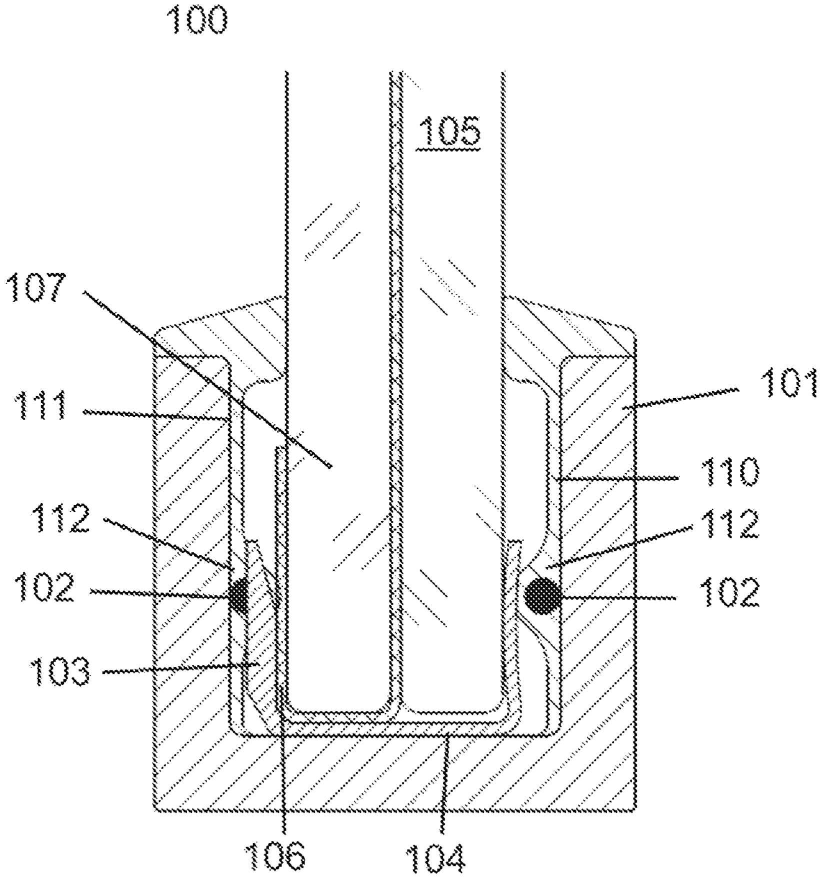
FIG. 3 shows a third embodiment of the molding assembly according to the invention.

FIG. 3 shows, by way of example, a third molding assembly 100 where a freely positionable and electrically conductive coupling element 104 for indirectly electrically contacting peripheral contacts 106 is provided along two opposite conductors 102. During attachment of plastic frame element 101 to peripheral portion 107, coupling element 104 may automatically come to rest against peripheral contacts 106 and conductors 102, thus establishing an electrical connection between conductors 102 and peripheral contacts 106. In FIG. 3, only a left contact to first conductor 102 is indicated, while the right conductor 102 is intended for a second peripheral contact 106 provided at a different location. For purposes of electrically contacting conductors 102 and/or peripheral contacts 106, a cutting contact 103 may be provided to electrically contact plastic sheath 112 of conductors 102 and/or conductors 102 or penetrate into electrical conductors 102 at least in a section or sections thereof in order to establish the electrical contact. By using different sizes and a plurality of cutting contacts 103, a plurality of mutually insulated conductors 102 could be electrically contacted independently of each other, for example using different cutting depths.

Plastic frame element 101 may be overall more rigid along the periphery than in the groove leg region 111 facing the planar element. This may be implemented by co-extrusion of materials of the same type having different Shore hardnesses or by co-extrusion of different materials having the same Shore hardness or by a combination of different types of materials having different shore hardnesses. For example, a thermoplastic material could be provided at the outer side, and an elastomer 110, for example, a thermoplastic elastomer (TPE), could be provided in groove leg region 111. The elastomer 110 could at the same time function as a conductor sheath in the vicinity of conductor 102 and be provided with electrically conductive additives at least in a section or sections thereof.

Figure 4:
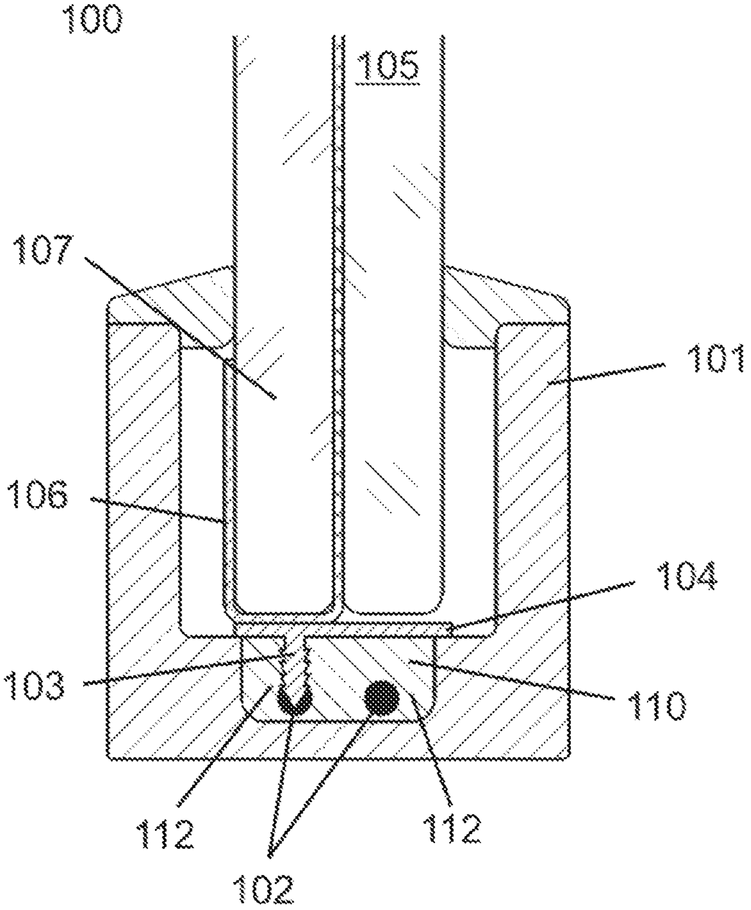
FIG. 4 shows a fourth embodiment of the molding assembly according to the invention.

FIG. 4 shows, by way of example, a fourth molding assembly 100 where an electrically conductive coupling element 104, which is freely positionable along conductors 102 and intended for indirectly electrically contacting peripheral contacts 106, is provided along two conductors 102 extending side by side and parallel to one another. During attachment of plastic frame element 101 to peripheral portion 107, coupling element 104 may automatically come to rest on peripheral contacts 106 and conductors 102 or penetrate thereinto, thus establishing an electrical connection between conductors 102 and peripheral contacts 106. In FIG. 4, only a left contact to first conductor 102 is indicated, while the right conductor 102 is intended for a second peripheral contact 106 provided at a different location. For purposes of electrically contacting conductors 102, a piercing contact 103 may be provided to pierce plastic sheath 112 of conductors 102 or at least partially penetrate into electrical conductors 102 and thus establish the electrical contact. By using different sizes and a plurality of piercing contacts 103, a plurality of mutually insulated conductors 102 could be electrically contacted independently of each other, for example using different piercing depths. U-shaped plastic frame element 101 may include a further groove in the groove bottom, within which the two conductors 102 extend in mutually insulated relationship. The groove may be filled with a further plastic material 110. This plastic material 110 may be implemented by co-extrusion of materials of the same type having different Shore hardnesses or by co-extrusion of different materials having the same Shore hardness or by a combination of different types of materials having different shore hardnesses. This plastic material 110 could at the same time function as a conductor sheath 112 in the vicinity of conductor 102 and be provided with electrically conductive additives at least in a section or sections thereof.

In the variants of FIGS. 3 and 4, for example, a TPE material as a conductor sheath 112 could be partially or entirely rendered sufficiently conductive so that the electrical contact can be established without the contact elements 103 penetrating fully to conductors 102. In all of the variants shown, plastic frame element 101 may include a sealing plastic material for sealing purposes, which may be provided on both sides along the upper groove edge of plastic frame element 101, for example by co-extrusion. This protects the electrical contact or the assembly from adverse ambient conditions after attachment of plastic frame element 101 to planar element 105.

Figure 5A:
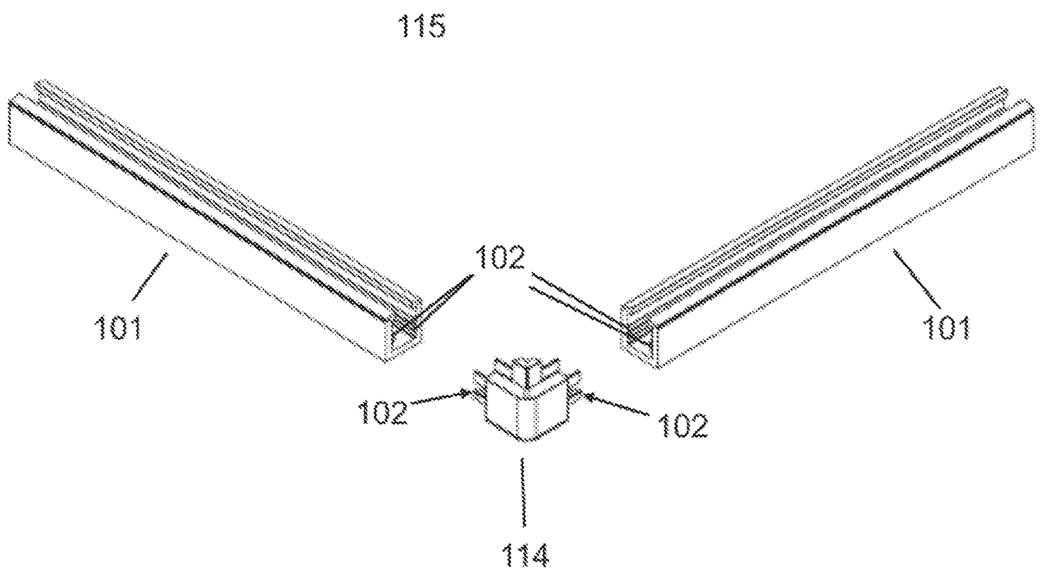
FIGS. 5*a* and 5*b* show connecting elements according to an embodiment of the invention.
Figure 5B:
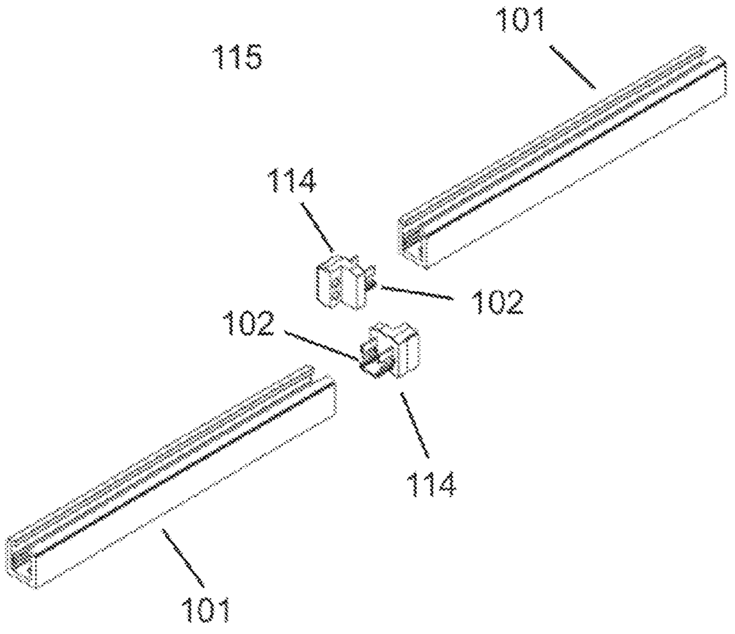

FIGS. 5*a* and 5*b* show connecting elements 114 for connecting two inventive plastic frame elements 101 and electrical conductors 102 located therein.

FIG. 5*a* shows a connection where two plastic frame elements 101 together with electrical conductors 102 located therein are connected to each other by a connecting element 114 at an angle of 90° with respect to each other. Connecting element 114 has electrical conductors 102 located therein, thereby ensuring the electrical connection between plastic frame elements 101.

FIG. 5*b* shows a longitudinal connection of two plastic frame elements 101 and electrical conductors 102 located therein. This connection is established by two connecting elements 114 and electrical conductors 102 located therein. The two connecting elements 114, in turn, are then electrically connected to each other. Alternatively, the two illustrated connecting elements 114 for longitudinal connection of two plastic frame elements 101 may also be combined into an assembly 115 or formed in one piece.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

TABLE 1

| | |
|---|---|
| 100 | molding assembly |
| 101 | plastic frame element |
| 102 | electrical conductor |
| 103 | cutting contact/piercing contact (second contact element) |
| 104 | coupling element |
| 105 | planar element |

TABLE 1-continued

| | |
|---|---|
| 106 | peripheral contact |
| 107 | peripheral portion |
| 108 | contact element (first contact element) |
| 109 | electrically conductive plastic material |
| 110 | elastomer/plastic material |
| 111 | groove leg region facing the planar element |
| 112 | plastic sheath of a conductor/conductor sheath |
| 113 | electrically insulating layer |
| 114 | connecting element |
| 115 | assembly |

The invention claimed is:

1. A molding assembly for establishing an electrical connection between an electrified planar element, which is formed with a peripheral electrical contact, and an electrical device, the molding assembly comprising:

a plastic frame element having an electrical conductor, the plastic frame element extending in a longitudinal direction between two ends, wherein a cross-section of the plastic frame element perpendicular to the longitudinal direction is adapted to receive a peripheral portion of the electrified planar element that includes the peripheral contact and extends along the longitudinal direction, wherein the electrical conductor extends along the longitudinal direction between the two ends of the plastic frame element on a side facing the electrified planar element so that, during attachment of the plastic frame element to the peripheral portion, an electrical connection is automatically establishable between the electrical conductor and the peripheral contact.

2. The molding assembly as recited in claim 1, wherein the electrical conductor comprises an electrically conductive plastic material.

3. The molding assembly as recited in claim 1, wherein the electrical conductor is surrounded by the plastic frame element at least along a portion or portions thereof on the side facing the electrified planar element, and/or at least partially bears against the plastic frame element on the side facing the electrified planar element, and/or forms a portion of a surface of the plastic frame element on the side facing the electrified planar element.

4. The molding assembly as recited in claim 1, further comprising a plurality of first contact elements disposed along the electrical conductor and configured to establish the electrical connection.

5. The molding assembly as recited in claim 1, further comprising an electrically conductive coupling element disposed and being freely positionable along the electrical conductor.

6. An assembly comprising at least one of the molding assembly according to claim 1 and at least one connecting element connected to the molding assembly and having an electrical conductor which is electrically connected to the electrical conductor of the molding assembly.

7. An electrified planar element having the molding assembly according to claim 1.

8. A wall comprising a plurality of the electrified planar elements according to claim 7, which are electrically connected to each other by connecting elements.

9. The molding assembly as recited in claim 4, wherein the electrical conductor and the first contact elements are formed as one piece.

10. The molding assembly as recited in claim 5, wherein the electrically conductive coupling element includes second contact elements.

11. The electrified planar element according to claim 7, wherein the electrified planar element comprises a glass pane or a laminated glass plane.

12. The molding assembly as recited in claim 1, wherein the electrical conductor comprises an electrically conductive plastic material and a metal.

13. The molding assembly as recited in claim 12, wherein a conductor core of the electrical conductor comprises a metallic conductor, and wherein the electrically conductive plastic material is overmolded over the metallic conductor or covers the metallic conductor at least on the side facing the electrified planar element along at least a part of the plastic frame element extending in the longitudinal direction.

14. The molding assembly as recited in claim 1, wherein the cross-section is U-shaped.

15. The molding assembly as recited in claim 14, wherein a first leg of the U-shaped cross-section includes the electrical conductor that projects inward toward a center of the U-shaped cross-section, and wherein a second leg of the U-shaped cross-section includes another electrical conductor that projects inward toward the center of the U-shaped cross-section, such that plastic frame element is configured to receive the electrified planar element between the electrical conductors such that at least one of the electrical conductors resiliently bears against the peripheral contact.

* * * * *